United States Patent [19]
Medin

[11] Patent Number: 4,736,427
[45] Date of Patent: Apr. 5, 1988

[54] MTS TEST SIGNAL GENERATOR

[75] Inventor: David Medin, Huntsville, Ala.

[73] Assignee: Sencore, Inc., Sioux Falls, S. Dak.

[21] Appl. No.: 918,069

[22] Filed: Oct. 14, 1986

[51] Int. Cl.$^4$ .............................................. H04H 5/00
[52] U.S. Cl. ........................................ 381/4; 332/23 R;
331/44; 331/45; 358/144
[58] Field of Search .................. 84/1.22; 328/24, 155;
307/13; 381/2, 3, 4; 331/44, 45; 358/139, 144,
143; 332/23 R

[56] References Cited
U.S. PATENT DOCUMENTS
4,643,066  2/1987  Oya ..................................... 84/1.22

Primary Examiner—Forester W. Isen
Attorney, Agent, or Firm—Edmond T. Patnaude

[57] ABSTRACT

An instrument for testing the multichannel sound circuits of a television receiver provides a plurality of discrete test signals respectively consisting of a carrier sine wave modulated with an audio frequency sine wave having an amplitude and phase which matches the MTS encoding formula.

11 Claims, 1 Drawing Sheet

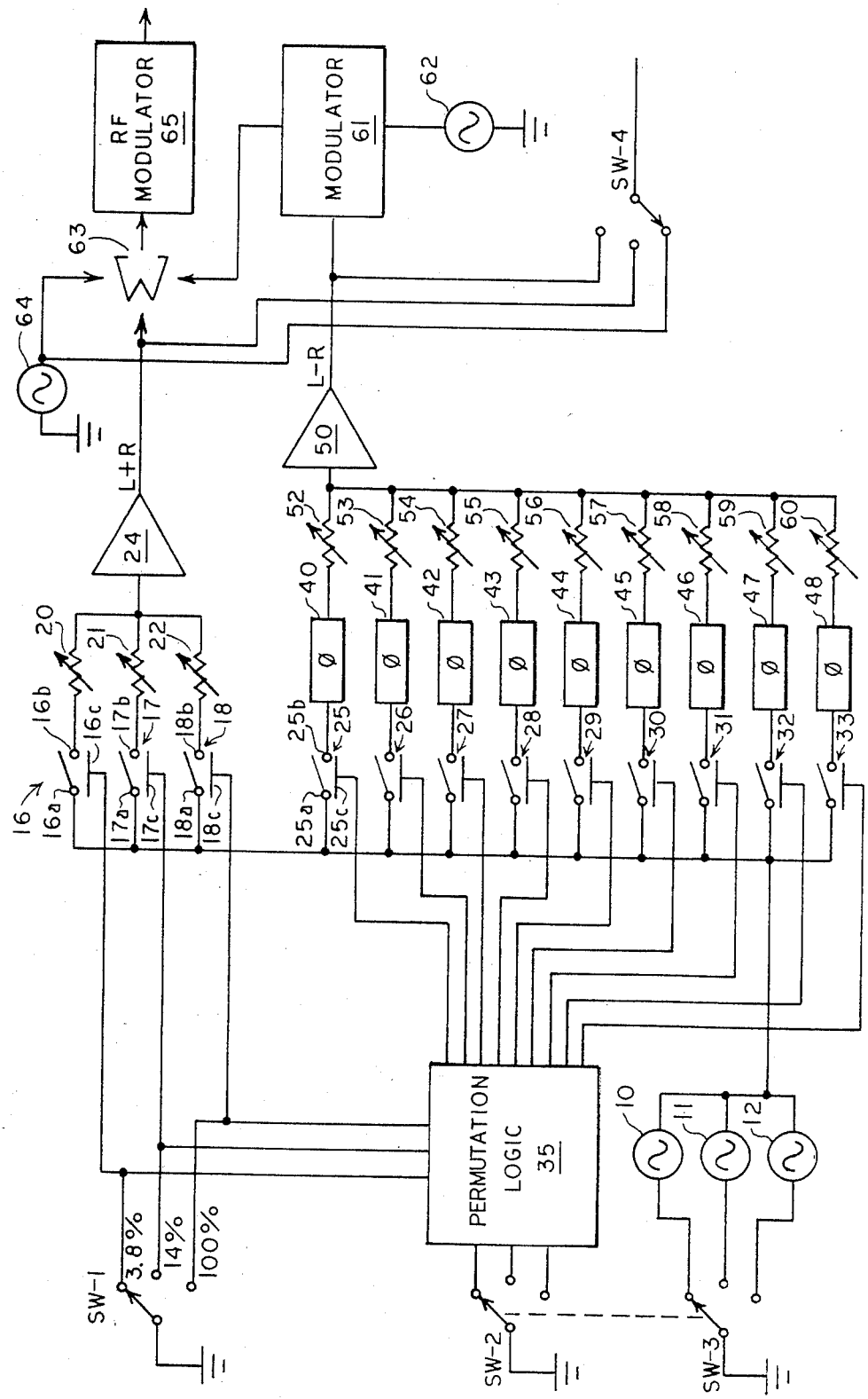

1

MTS TEST SIGNAL GENERATOR

The present invention relates in general to the testing, aligning and adjusting the stereo sections of stereo television circuits, and it also relates to a new and improved test signal generator for producing an MTS compatible stereo television test signal.

BACKGROUND OF THE INVENTION

Multichannel television sound (MTS) has been sanctioned by the Federal Communications Commission for use in broadcast television. The sound signal is transmitted on the usual FM audio carrier and includes 1. a left plus right audio signal (L+R) which is modulated on the FM audio carrier so as to be usable by mono television receivers; 2. a left minus right audio signal (L−R) which is modulated on an AM subcarrier superimposed on the FM audio carrier and located at 31.468 Hz from the FM carrier; and 3. a pilot signal having a frequency of 15.734 Hz, the horizontal-scanning frequency, also superimposed on the FM audio carrier.

In order to imrpove the signal-to noise ratio of MTS, the audio signals are spectral companded, i.e., preemphasized in accordance with a prescribed formula, before being broadcast. When received, the audio signals are then correspondingly expanded, i.e. deemphasized, in accordance with corollary of the same formula.

The spectral expander circuits in stereo TV transmitters and receivers employ active filtering, level detection, and variable gain elements which process the audio signals according to the fixed mathematical formula. The expander circuits in a stero television receiver thus require frequency alignment and component adjustment in order to match the compander circuits at the transmitter. A standard, continuous spectrum MTS signal could be used when tuning and adjusting the expander and/or compander circuits so that they precisely match the FCC authorized companding formula, but the cost of such a signal source would be very high as compared to the more common television test signal generators, particularly when used in aligning and adjusting the deemphasis circuits of television receivers.

SUMMARY OF THE INVENTION

Briefly, in accordance with one aspect of the present invention a plurality of discreet test tones are selectively applied to the compander and/or expander circuits of the MTS system under test. The test generator which produces the test tones comprises a plurality of audio sinewave signal generators, a plurality of audio signal attenuators, and a plurality of pairs of discreet phase-/amplitude shifters. Using, for example, three audio sinewave signal generators, three signal attenuators and three pairs of phase/amplitude shifters, nine different audio test tones can be provided.

Knowing the frequency of each tone and its amplitude and phase shift when applied to the compander and/or expander encoding circuits, the required output from these circuits can be calculated and matched to the prescribed MTS encoding formula by proper tuning and adjustment of the circuits by the service technician. While the use of nine such test tones has been found to provide a 25 decibel stereo separation at 1 KHz, a greater or lesser number of respectively different audio test tones could be provided if desired.

BRIEF DESCRIPTION OF THE DRAWING

The present invention will be better understood by a reading of the following detailed description taken in connection with the accompanying drawing wherein:

The single FIGURE is a schematic circuit diagram of a test signal generator embodying the present invention.

DETAILED DESCRIPTION OF THE PREFERRED EMBODIMENT

Referring to the drawing, three tone sources of respectively different pure audio frequency sine waves 10, 11 and 12 are connected to the contacts of a manual selector switch SW-1 having the common wiper connected to ground whereby the switch SW-1 can be used to enable a selected one of the sources 10, 11 and 12. The sinewaves generated by the tone sources 10, 11 and 12 are widely spaced apart in the audio spectrum and in a preferred embodiment of the invention are at 300 Hz, 1 KHz and 8 KHz. However, it will be understood by those skilled in the art that these particular frequencies are not critical.

It may thus be seen that the selector switch SW-1 may be used to couple a selected one of the tone sources 10, 11 and 12 to ground so that the output of the selected source is applied to the bus 14 which is in turn connected to the normally open switch contacts 16a, 17a, and 18a of a plurality of electronic analog switches 16, 17 and 18. Each of the switches 16, 17 and 18 includes a second switch contact 16b, 17b and 18b which is electrically connected to the associated contact 16a, 17a and 18a when the associated control terminal 16c, 17c and 18c is connected to ground by a modulation level selector switch SW-2.

The switch contacts 16b, 17b and 18b are coupled through respective ones of a plurality of adjustable resistance attenuators 20, 21 and 22 to the input of a buffer amplifier 24. The output signal from the amplifier 24 simulates the L+R portion of a multichannel television stereo sound signal. The resistors 20, 21 and 22 thus constitute L+R modulation level adjusters and are set to provide the precise L+R signal level of the selected audio frequency for the selected modulation level. As shown, the resistors 20, 21 and 22 when properly calibrated provide outputs signals corresponding to modulation level adjustments of 3.8%, 14% and 100% selected by the selector switch SW-2. For example with the switch SW-1 set to select a tone of 300 Hz, and the switch SW-2 set to select a modulation level of 3.8%, as shown in the drawing, the output of tone generator 10 will be attenuated by resistor 20 and applied to the input of the buffer amplifier 24.

If desired, the modulation level selector switch SW-2 can be provided with additional switch contacts, and a corresponding number of additional analog switches and level adjustment resistors can be provided to develop of a greater number of test tone and modulation level combinations to match additional points on the L+R compander and/or expander curves.

The bus 14 is also connected to the switch contacts 25a-33a of a plurality of electronic anolog switches 25-33 also having switch contacts 25b-33b respectively. The switches 25-33 have respective control terminals 25c-33c which are connected to nine different outputs of a permutation logic chip 35 having three of its inputs connected to the switching contacts of the selector switch SW-2 and three others of its inputs connected to the switching contacts of a modulation tone selector switch SW-3 whose wiper is ganged with the wiper of the switch SW-1. As shown the wiper of the switch SW-3 is connected to ground whereby a particular pair of the six inputs to the microprocessor chip 35 are grounded depending on the respective positions of the selector switches SW-2 and SW-3. The microprocessor chip 35 contains the necessary permutation logic so that the one of the nine outputs corresponding to the selected frequency and modulation selected level is grounded to operate the corresponding one of the switches 25–33.

The switch contacts 25b–33b are respectively connected to one of a plurality of phase shifters 40–48 which are respectively connected to the input of a buffer amplifier 50 by amplitude adjustment resistors 52–60. Selection of the tone and modulation level by the operator thus results in the selected audio frequency sine wave being coupled through a particular one of the pairs of phase and amplitude shifters to the amplifier 50. The output of the amplifier 50 corresponds to the L−R portion of the multichannel television sound stereo signal and is connected to the modulation input of a modulator 61 to which a carrier signal having a frequency of 31,468 Hz is connected. This carrier is supplied from a pure sine wave source 62. The carrier which is thus provided at the outut terminal of the modulator 61 is at the television stereo subcarrier frequency. This frequency is, of course, twice the standard television horizontal line frequency.

The simulated (L−R) modulated carrier signal from the modulator 61 is combined in an adder 63 with the simulated audio (L+R) signal from the amplifier 24 and with a pure sinewave at the FCC authorized pilot frequency of 15.734 Hz supplied from a sinewave source 64. The pilot frequency is, of course, the standard horizontal line frequency. The combined output sighal from the adder 63 thus consists of simulated audio frequency (L+R) signal, a 31.468 Hz carrier modulated with a phase and amplitude shifted simulated audio frequency (L−R) signal and a pilot sinewave of 15734 Hz. The combined signal thus corresponds to the authorized MTS television signal and is applied to an RF modulator 65 where it is modulated onto a radio frequency carrier which is preferably at a frequency of 4.5 MHz but may be at any other suitable radio frequency, such for example, as at 45.75 MHz or at the carrier frequency of a commonly unused television channel such as channel 3 or channel 4.

In order to enable the technician to investigate the individual components of the composite test signal when, for example, adjusting the modulation level, the phase shifters and the amplitude shifters to match the preemphasis and/or deemphasis curves of the MTS system, the switch contacts of an audio test signal switch SW-4 respectively connected to the outputs of the amplifiers 24 and 50, to the sinewave source 64 and to the output of the adder 63.

It may thus be seen that the output of the RF modulator 65 is an RF carrier modulated with a discrete audio frequency tone, with the pilot, and a subcarrier modulated with the same discrete audio test tone phase and amplitude shifter in accordance with the prescribed mathametical formula. These modulation signals correspond to the preemphasized stereo signals mathematically encoded to match the FCC authorized curves and include the level adjusted (L+R) signal and the (L−R) signal having a fixed, predetermined phase and amplitude shift for the particular frequency and modulation level, these signals being compatible with the MTS standards. By selecting different tone frequencies and different modulation levels, the technician has several compatible test signals available for use in tuning and adjusting the stereo circuts of television transmittors or receivers at selected points which are uniquely related to the selected tone and modulation level.

In the illustrated embodiment of the invention, three tone generators and three modulation levels are shown, but a greater or lesser number of tone generators and level selectors can be provided. For example, if four tone generators and three modulation levels were provided, then twelve pairs of phase and amplitude shifters would be required to provide a different (L−R) signal for each possible permutation of the selected tone and modulation level to match the FCC authorized equation for the MTS system.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A test signal generator, comprising in combination
   means for generating a plurality of sine waves at respective ones of a plurality of different audio frequencies,
   first means for adjusting the level of a selected one of said sine waves by a selected one of a plurality of discrete gain factors to produce a first signal,
   second means for shifting the phase of the selected one of said sine waves through one of a plurality of predetermined, discrete phase angles corresponding to the selected one of said gain factors and to the selected one of said sine waves to produce a second signal,
   first modulator signal means for modulating a carrier wave with said second signal to provide a first modulated carrier wave, and
   means for combining said first modulated carrier wave with said first signal to provide a combined test signal.

2. A test signal generator according to claim 1, comprising
   second modulator means for modulating a radio frequency carrier with said combined signal.

3. A test signal generator according to claim 2, comprising·
   means for combining with said first modulated carrier wave and said first signal a sine wave having a frequency of one-half the frequency of said carrier.

4. A test signal generator according to claim 3 wherein
   said carrier has a frequency of 31,468 Hz.

5. A test signal generator according to claim 4 comprising
   manually operated selector switch means for connecting to an output terminal either said first signal, said second signal or said combined signal.

6. A test signal generator according to claim 1 comprising
   third means for attenuating said selected one of said sine waves by an amount corresponding to said selected one of said gain factors and to said selected one of said frequencies.

7. A test signal generator comprising in combination,
an audio tone source of a plurality of audio frequency sine waves each having a different discrete audio frequency,
first selector switch means for selecting one of said audio frequency sine waves,
a plurality of preset attenuators,
second switch means for connecting the selected one of said discrete audio frequency sine waves to a selected one of said attenuators,
a plurality of encoding circuits each providing a different preset phase shift and preset amplitude shift,
means for connecting said selected one of said audio frequency sine waves to the one of said encoding circuits corresponding to said selected one of said audio frequency sine waves and said selected one of said attenuators,
first modulator means for modulating a first carrier wave with the output signal from said one of said encoding circuits, and
means for combining the output signal from said selected one of said attenuators with the modulated carrier wave output from said modulator means.

8. A signal generator according to claim 7, comprising
means for combining a second audio frequency sine wave with said output signal from said selected one of said attenuators and the modulated carrier wave output from said modulator means to provide a combined test signal.

9. A signal generator according to claim 8 comprising second modulator means for modulating and RF carrier wave with said combined signal.

10. A signal generator according to claim 9 wherein said second audio frequency sine wave has a frequency of 15,734 Hz.

11. A signal generator according to claim 10 wherein said first carrier wave has a frequency of 31,468 Hz.

* * * * *